United States Patent [19]

Ernst et al.

[11] Patent Number: 4,772,643

[45] Date of Patent: Sep. 20, 1988

[54] HIGH PERFORMANCE AQUEOUS URETHANE EPOXY COATINGS

[75] Inventors: G. Dale Ernst, Minnetonka; Alan R. Schuweiler, St. Paul, both of Minn.

[73] Assignee: Tennant Company, Minneapolis, Minn.

[21] Appl. No.: 131,894

[22] Filed: Dec. 11, 1987

[51] Int. Cl.$^4$ .............................................. C08L 75/04
[52] U.S. Cl. .................... 523/414; 524/871; 528/59; 528/61; 528/118; 528/119; 528/121; 528/123; 528/124
[58] Field of Search ............. 523/414; 524/871; 528/59, 61, 118, 119, 121, 123, 124

[56] References Cited

U.S. PATENT DOCUMENTS

| | | | |
|---|---|---|---|
| 4,427,804 | 1/1984 | Tortorell et al. | 523/420 |
| 4,489,179 | 12/1984 | Tortorell | 523/404 |

*Primary Examiner*—Maurice J. Welsh
*Attorney, Agent, or Firm*—Kinzer, Plyer, Dorn, McEachran & Jambor

[57] ABSTRACT

A crosslinked and chain extended urethane-epoxy copolymer coating with high performance properties typical of two part urethane solution coatings results from cure at ambient temperatures (e.g. 70° F.) when the two aqueous systems are merely mixed, stirred and spread at the site. One aqueous system is a dispersion of polyepoxides. The other aqueous system is a primary amine-terminated urethane oligomer in which no less than about 25% and no more than about 40% of the amine functionality is substituted by a salt of a volatile acid which aids dispersion of the oligomer. Minimal organic solvent is present, and as the acid evaporates, the primary amine is restored for linking with the epoxy groups.

18 Claims, No Drawings

HIGH PERFORMANCE AQUEOUS URETHANE EPOXY COATINGS

This invention relates to the formation of urethane-epoxy polymer compositions employed as ambient curing (room temperature curing, e.g. 70° F.) protective coatings for substrates in service conditions where exceptionally high performance film characteristics are required. More specifically the present invention is identified as a two component aqueous system to be combined at the point of use; one component is an aqueous dispersion of polyepoxides and the other component is an aqueous dispersion of a urethane oligomer terminated with amine functionality. Dispersion of the urethane oligomer is facilitated by converting a limited amount of the terminal amines to a cationic ammonium salt, for example one that is derived from acetic acid.

BACKGROUND OF THE INVENTION; PRIOR ART

Polyurethane coatings are known to have the advantages of high gloss, chemical resistance and abrasion resistance. When formulated properly they can display flexibility, impact resistance and toughness. Additionally, when aliphatic or cycloaliphatic multifunctional isocyanate monomers are utilized in the composition, they exhibit outstanding weatherability and lightfastness characteristics.

Epoxy thermosetting resin coatings are known, the thermosetting property being achieved by a crosslinking cure. Epoxy coatings have the advantages on cure of good adhesion, dielectric or insulation properties, dimensional stability, fatigue resistance and low shrinkage, among others.

It has been proposed to combine the two, using polyepoxides with 1,2-oxirane functionality as a crosslinking agent for a urethane oligomer that has terminal primary amine functionality and has been dispersed in water with the aid of a neutralizing, volatile organic acid such as acetic acid. The epoxy as a crosslinker is named and disclosed as such in WATERBORNE POLYMERIC FILMS by A. Tortorello, M. Kinsella and R. Gearon, technical report AFWAL-TR-80-4197, Wright-Patterson Air Force Base, Dayton, Ohio, 1980. Neutralization was one hundred percent, since nothing less than the equivalent amount of acetic acid is mentioned. This is confirmed by Tortorello U.S. Pat. No. 4,427,804 (1984), where "an equivalent amount" of acetic acid is specified and by U.S. Pat. No. 4,489,179 (1984) where it is stated "Neutralization of the amine content by the acid should be at least 50% of stoichiometry . . . 100% being preferred."

An important function of the ketimine containing component of the Tortorello patents is that it, along with the volatile neutralizing acid, is used as an emulsifying agent for liquid and/or solid polyepoxides. The level of neutralization of the amine terminated component of the present invention by volatile organic acid ranges from 25–40% of the stoichiometric level. The partly neutralized amine terminated component of our system, in the form of a colloidal dispersion, does not act as an emulsifying agent for liquid or solid polyepoxide resins, therefore, both the specified neutralization range of our system, and the process of combining components in our method are significantly different from the Tortorello teachings.

It is noteworthy that the physical properties and water resistance of the various systems utilizing ketimine blockage of primary amine functionality as described in WATERBORNE POLYMERIC FILMS, above, were well below the level that could be expected from high performance solvent borne urethane coatings. We have found the neutralization level of 25–40% is critical for the development of optimum physical properties during cure: as neutralization is increased above 40%, physical properties of films cured at room temperature are significantly reduced, and are not comparable with existing solvent containing urethane coatings products. The systems of this invention, on the other hand, have physical properties and water resistance properties similar to those of high quality solvent borne moisture cure and two part urethane coatings systems.

Both patents above are limited by the requirement that the ketone of choice to form a ketimine blockage of primary amine functionality is ". . . a ketone which is hindered to prevent reaction with a secondary amino hydrogen atom, this hindered ketone being selected from the group consisting of non-cyclic ketones containing one group selected from methyl or ethyl and a second group containing at least four carbon atoms, and cyclic ketones which are substituted in the alpha position."

Using ketimine formation techniques to be described, ketimines made from hindered non-cyclic ketones were compared extensively with ketimines using non-hindered, non-cyclic ketones to terminate isocyanate functional prepolymers. After dispersion and blending with an emulsion of polyepoxides, we repeatedly found properties of the cured coatings to be identical. Therefore, the use of the "hindered" ketone is not necessary and is of no benefit in this invention. A non-hindered ketone is our ketone of choice because it can be more readily and effectively stripped from the dispersion, thus eliminating substantially all of the undesireable volatile content.

The coating systems described in the examples and claims of the above prior art patents are further limited as they contain substantial amounts of volatile solvents. U.S. Pat. No. 4,489,179 states that the epoxy crosslinker "requires the presence of organic solvent . . . [enough] to substantially completely dissolve the polyepoxide . . . [and] 60% and 80% solids content solutions are particularly effective." The room temperature curing system as described would have a volatile organic content (VOC) substantially in excess of the Environmental Protection Agency (EPA) limits.

As will be explained below, only minimal quantities of volatile organic solvents are needed in either of the two components of this invention, to the degree that the VOC falls well below current EPA requirements.

The viscosity of the liquid polyepoxide of U.S. Pat. No. 4,427,804 (e.g. 12,000 cps) and of the 60–80% nonvolatile solution of the polyepoxide of U.S. Pat. No. 4,489,179 is such that great shearing forces, and high shear mixing equipment, are required to create the emulsion of resin in the ketimine blocked component. The resultant emulsion is "stable in the sense that no significant change is observed for at least one hour". To one versed in epoxy technology, this statement carries the implication that the pot life of the composite emulsion would coincide with the period of emulsion stability and it would be expected the the pot life would not exceed more than a few hours.

Again our invention differs in that both components are in shelf stable (up to one year or more) emulsion and colloidal dispersion form, and are combined just prior to application by simple mixing techniques. The pot life of the composite is typically measured in terms of days, rather than hours.

An important feature of this invention is the use of a substantial equivalency excess of the amine terminated urethane oligomer to epoxide equivalency, as opposed to the stoichiometric ratio suggested in the Tortorello document and patents. As will be explained, this equivalency excess changes the curing mechanism in such a way as to promote the development of high performance urethane film characteristics.

THE OBJECTIVES OF THE PRESENT INVENTION

The primary objective of the present invention is to design and develop aqueous, ambient curing urethane-epoxy copolymer coating systems that are substantially free of hazardous volatile organic solvents and free diisocyanate monomers. Expressly, these coating systems can provide physical, chemical and water resistance properties of room temperature cured films similar to those found only in high quality solvent borne moisture cure and two part urethane coatings systems.

Another object of the present invention is to enable an ambient curing urethane-epoxy copolymer coating to be created at the site of application simply by mixing, stirring and then spreading two components, component A being an aqueous dispersion of polyepoxides, and component B being an aqueous dispersion of an amine terminated urethane oligomer having less than about 40% but more than about 25% by weight of the amine functionality neutralized to salt form. The VOC of either component is well below the level established by the EPA as environmentally unacceptable. Component A above is in the form of an oil-in-water emulsion, and the inclusion of from about 1% to 5% by weight of "coalescing" type solvents (i.e., high boiling, slow evaporating, water miscible) is necessary for the epoxy emulsion particles and the colloidal sized particles of the amine terminated urethane oligomer to "melt" together in the composite coating to form a proper film during the process of the evaporation of water and the breaking of the emulsion after application of a thin film at ambient conditions. Volatile organic solvents are normally stripped from component B (to less than 1%), but the coalescing type solvent, or cosolvent, can be added to either component, if required. No blender or shearing equipment is required when mixing, stirring and spreading the component system at the site of application.

Another object of the present invention is to devise a two component aqueous urethane-epoxy copolymer coating system as above described in which the desirable urethane properties of high gloss and high abrasion resistance can be highly developed while using only enough epoxide to facilitate cure, to obtain adhesiveness and to provide improved chemical and water resistance in the cured coating.

An additional object of the present invention is to limit the degree of neutralization of the amine terminated urethane oligomer (component B) so that the ambient cure will proceed as fast as possible without interfering with the urethane characteristics of the coating mentioned in the preceding paragraph, and in fact encouraging the development of those characteristics while at the same time permitting development of the desired epoxy characteristics.

PREFERRED EMBODIMENTS

Primary amines react with isocyanate functional polymers in crosslinking reactions, one primary amine reacting with two isocyanate groups, causing almost instant gellation. A molecule containing primary amine functionality can be attached to an isocyanate terminated polyurethane, however, if it has one other functional group bearing one active hydrogen (e.g., secondary amine, hydroxyl, thio compound, etc.). The primary amine functionality is first blocked by the condensation reaction of the primary amine and the carbonyl of a ketone, forming a ketimine.

Monoprimary and/or polyfunctional primary amines that contain one other functional group bearing one active hydrogen atom, such as those of the formula $$H-X-(R_1NH_2)_m(R_2)_n$$

are preferred, wherein m represents the integers 1 or 2, while concurrently, n represents the integers 1 or 0. $R_1$ represents the residue of a mono or polyfunctional primary amine after removal of the primary amino nitrogen, and the removal of the functional group bearing one active hydrogen atom. $R_1$ may be aliphatic, cycloaliphatic, heterocyclic, or aromatic and may be saturated or unsaturated. $R_1$ may be extensively branched, and can bear one or more additional primary amine functional groups.

$R_2$ may be aliphatic, cycloaliphatic, heterocyclic, or aromatic, and may be saturated or unsaturated. $R_2$ may be attached to X, giving X a valence of 3, or it may be attached to $R_1$, giving a valence of 2. $R_2$ may be a simple side chain for X or $R_1$, or can connect X and $R_1$ to complete a cycloaliphatic structure, or it can be terminated with a primary amine functional group. When $R_2$ is terminated by a primary amine functional group it may be identical to $R_1$ or it may be dissimilar.

X represents a functional group bearing a single active hydrogen atom that is reactive with free isocyanate groups; nitrogen, oxygen or sulfur. The literature lists a number of additional functional groups with single active hydrogen attachment (e.g. carboxylic acids, halogen acids, etc.), that interact with isocyanates, but currently, these are not preferred due to instability and undesired side reactions or decomposition products. The functional group X and its single active hydrogen atom is therefore either a secondary amine, a hydroxyl, or a thio group. The entire molecule represented by the above formula is either a monosecondary, monohydroxy, or monothio, mono or poly functional primary amine.

Examples of monosecondary, monoprimary amines in commerce are limited. Compounds of this type that have been found suitable for the purposes of this invention are, although not limited to; N-(aminoethyl) piperazine, and N-methyl-1,3-propanediamine. Examples of monosecondary, polyfunctional primary amines in commerce are likewise somewhat limited. Diethylene triamine, containing two primary amine groups and one secondary amine group, is presented as one well-known example of this type of compound.

Suitable examples of monohydroxy, monoprimary amines are, although not limited to; monoethanolamine, monoisopropanol amine, 3-amino-1-propanol, and the like. A suitable example of a monohydroxy, polyfunctional primary amine is, although not limited to; 1,3-diamino-2-hydroxypropane.

Monothio, mono or polyfunctional primary amines can be prepared by the reaction of hydrogen sulfide or certain mercaptans with unsaturated monoamines; allyl amine, butenyl amine, cyclohexenyl amine, and the like. Examples of useful mercaptans for these syntheses include, among others, 1,3-propanedithiol, 1,4-butanedithiol, 1,4-benzenedithiol, and the like.

Before the mono or polyfunctional primary amines above can be used to terminate the free isocyanate functionality of an isocyanate functional prepolymer, however, the primary amine functional groups must first be blocked, or "masked" by reacting the primary amine functional groups with ketones, a condensation reaction wherein the carbonyl of the ketone combines with the two active hydrogens of the primary amino nitrogen forming water, which splits away, leaving an imine or polyimine such as those of the formula

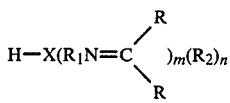

wherein

is the residue remaining from a monoketone by the removal of the carbonyl, and wherein the two R radicals, when combined, contain from 2 to about 24 carbon atoms. The two R radicals preferably are aliphatic. They may be identical in structure, or may vary in size and/or configuration. Suitable examples of useful ketones include, among others, acetone, methylethyl ketone, diethyl ketone, methylisobutyl ketone, dibutyl ketone, diisobutyl ketone, methylisopropyl ketone, methyloctyl ketone, ethylbutyl ketone, dioctyl ketone, and the like. The ketimines or polyketimines may be prepared by methods disclosed in U.S. Pat. No. 3,291,775, and in Example 1(a) of this document.

A ketimine or polyketimine with a functional group bearing one active hydrogen atom is then added to an isocyanate functional prepolymer; in the subsequent addition reaction, an active hydrogen combines with an isocyanate group, yielding a ketimine (or polyketimine) terminated polyurethane oligomer, such as those of the formula

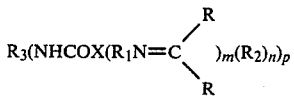

wherein p represents a number ranging from 1.01-5, preferably 1.1-3, and, wherein $R_3$ represents the residue remaining of an isocyanate functional prepolymer after removal of the free isocyanate function. Such prepolymers can be prepared, as is well known in the art, by combining an excess of one or more monomeric polyisocyanates having at least two free isocyanate groups, with monomeric or polymeric compounds containing at least two active hydrogen atoms which are reactive with free isocyanate groups.

Representative monomeric polyisocyanates, while not being limited to these compounds, include; toluene diisocyanate, 4,4'-diphenyl diisocyanate, 4,4'-diphenylmethane diisocyanate, 4,4'-diphenyl-ether diisocyanate, dianisidine diisocyanate, 1,5-naphthalene diisocyanate, p-phenylene diisocyanate, trimethylene diisocyanate, octadecylmethylene diisocyanate, 2'-chloropropane diisocyanate, 4,4'-methylene-bis(phenyl isocyanate), isophorone diisocyanate, 1,6-hexamethylene diisocyanate, 4,4'-methylene-bis(cyclohexyl isocyanate), 4,4'4"-triphenyl-methane triisocyanate, 1,3,5-benzene triisocyanate, poly methylene poly(phenyl isocyanate), and/or di or tri-isocyanate functional adducts of the above mentioned monomers with polyhydroxy monomers, such as the adduct of one mol of trimethylolpropane with 3 mols toluene diisocyanate, or 3 mols of 4,4'-methylene-bis(cyclohexyl isocyanate).

The literature is replete with listings of suitable monomeric or polymeric compounds containing at least two active hydrogen atoms which are reactive with free isocyanate groups, including; water, mercaptans, primary and secondary amines, acids, and hydroxyl containing compounds. Hydroxyl containing compounds are currently the materials of choice for the preparation of isocyanate functional prepolymers for the purposes of this invention. Representative hydroxyl containing compounds include; ethylene glycol, diethylene glycol, 1,3-propylene glycol, 1,4-butane diol, glycerol, trimethylolpropane, erythritol, pentaerythritol, polyethers, such as poly(ethylene oxide) diol, poly(ethylene oxide/propylene oxide) diol, poly(propylene oxide) diol, and poly(tetramethylene oxide) diol, polyactones, such as polycaprolactone, and polyhydroxypolyesters of polycarboxylic acids, such as succinic acid, adipic acid, suberic acid, azelaic acid, sebacic acid, phthalic acid, isophthalic acid, and teraphthalic acid with polyols such as ethylene glycol, diethylene glycol, 1,4-butane diol, trimethylolpropane, glycerol, erythritol, pentaerythritol, poly(ethylene oxide) diol, poly(ethylene oxide/propylene oxide) diol, and poly(tetramethylene oxide) diol.

Preparation of the isocyanate functional polyurethane prepolymer can be by the conventional one-stage process, whereby the reactants, including at least one polyisocyanate having at least two isocyanate groups, at least one organic compound having at least two active hydrogen functional sites, and preferably having at least two hydroxyls as the source of the active hydrogen atoms, and which preferably has a molecular weight in the range of 200 to 7500, and optionally, at least one chain-extending organic compound having two active hydrogen atoms, or chain-branching organic compound having at least three active hydrogen atoms, and which preferably has a molecular weight below 300, are mixed together and reacted simultaneously, employing an isocyanate:active hydrogen ratio of from 1.01:1 to 5:1, preferably 1.1:1 to 3:1.

Preparation of the isocyanate functional polyurethane prepolymer may be carried out in the melt or in solution, that is, in the absence or presence of organic solvents which are inert with respect to isocyanate moities. Perffered organic solvents for preparation of this isocyanate functional prepolymer in solution are those that are substantially soluble in water, or miscible with water, since the dispersion of the subsequently formed ketimine terminated urethane oligomer into water is greatly facilitated by the coupling action of the organic solvent with water to solubilize and disperse the resin.

Organic solvents found suitable for this preparation include, but are not limited to; methyl acetate, ethyl acetate, amyl acetate, acetone, methylethyl ketone, diethyl ketone, methylisobutyl ketone, dimethyl formamide, dioxane, and methyl pyrrolidone. Prepolymer preparation should be carried out in anhydrous conditions at a temperature in the 50°–80< C. range for several hours.

It is well known to those skilled in the art that the physical and performance properties of coatings cast from solvent solutions of polyurethane prepolymers can be adjusted almost infinitely by varying certain prepolymer parameters. It has been found that the properties of aqueous urethane-epoxy copolymer coatings are likewise influenced by prepolymer design; that is to say the design of the primary amine functional urethane oligomer primarily determines whether the cured coating will exhibit properties that compare favorably with high performance type moisture-cure or two-part urethane coatings cast from solvent solutions.

For the most part, the well-known, well-understood design principles for urethane prepolymer solution coatings are applicable in designing these aqueous urethane-epoxy copolymer coatings, with one important exception, which relates to the size of the prepolymer molecule. In urethane prepolymer solutions it is necessary to use a substantial excess of polyfunctional isocyanate monomer in order to achieve suitable shelf stability. Even when prepolymers are essentially linear from combining only difunctional reactants, the combining ratio of isocyanate:hydroxyl equivalents must exceed about 1.6, resulting in prepolymers of high isocyanate functionality, and low equivalent weight per unreacted isocyanate functional group that typically falls into the range of 350–1000. These prepolymers cure upon application through isocyanate:isocyanate or isocyanate:hydroxyl interactions, both being essentially chain-extending types at ambient curing conditions. Thus, coatings made from polyurethane prepolymer solutions develop their characteristic properties as the result of chain extending reactions that occur during cure.

The prepolymer to be used in this waterborne system, on the other hand, cures through primary amine:1,2-oxirane interactions, which are primarily cross-linking in nature. This prepolymer must be sufficiently linear in design and possess sufficient chain-branching segments, and be of a sufficient molecular size, prior to termination of isocyanate functionality, if it is to impart "urethane-like" character to the copolymer system. To accomplish this, isocyanate:hydroxyl combining ratios below 2.0 are employed; and these may range from about 1.01 to about 2.0, preferably between about 1.1 to about 1.5. The isocyanate equivalent weight of the prepolymer could range as low as about 250 to about 5000, but preferably should range from about 750 to about 4000, to accomplish the purposes of this invention.

The addition reaction resulting from combining a mono or polyketimine with a functional group bearing an active hydrogen atom and an isocyanate functional prepolymer should also be carried out in anhydrous conditions, since ketimines are readily hydrolyzed, and free isocyanates are reactive with water. Reaction conditions vary according to the nature of the functional group bearing the active hydrogen atom on the ketimine. When the functional group is a secondary amine, the addition reaction with an isocyanate links the ketimine and the urethane prepolymer through a substituted urea linkage, a reaction that occurs very rapidly, even at ambient temperature conditions. The reactants are combined using vigorous agitation. The reaction is accompanied by a substantial increase in viscosity. When the functional group bearing an active hydrogen atom is a hydroxyl, reaction time and temperature should be increased since the rate of the isocyanate:hydroxyl reaction, linking the ketimine molecule to the prepolymer through a urethane linkage, is much slower than the isocyanate:secondary amine rate. The isocyanate:thio reaction, linking a monothio, mono or polyketimine to an isocyanate functional prepolymer through a thiourethane linkage, occurs at a rate somewhat slower than the isocyanate:hydroxyl rate and the reaction time, in particular, should be prolonged, and the reaction temperature should be increased to the 90°–100° C. range.

Once the urethane ketimine oligomer is formed, there usually is no reason for maintaining the product in anhydrous conditions. Hydrolysis of the ketimine can occur with exposure of the product to moisture, but the product is stable in either condition.

The ketimine terminated oligomer can be dispersed in water by neutralizing a portion of the amine functionality with a volatile solubilizing acid. In the presence of a salt, or acid neutralized resin, the oligomer spontaneously disperses in water. Simultaneously, hydrolysis of the imine structure occurs; the ketone is regenerated, and the primary amine functionality is restored, as such, or as a primary amine salt, since a portion of the amino nitrogens have been neutralized with the volatile solubilizing acid, as indicated schematically by the formulae:

$$R_3(NHCOX(R_1NH_2)_m(R_2)_n)_p +$$

60–75%

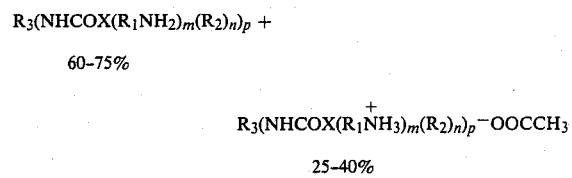

25–40%

The use of volatile solubilizing acids to disperse amine functional polymers is well-known art, and any of the well-known acids may be used to neutralize the oligomer. Acetic acid is commonly used for this purpose, and is preferred when the end product's intended use is that of a room temperature-curing protective coating system. The reactivity of a primary amine salt is diminished as compared with an unneutralized primary amine, so it is beneficial to select an acid that volatilizes readily from a thin liquid film of the applied product in ambient conditions.

It has been found that the properties of the ultimate urethane-epoxy copolymer coating system are influenced by the quantity of the solubilizing acid used to neutralize the urethane oligomer, or the percentage of amine functionality that is neutralized. It might be expected that the dry time rate of a coating system comprised of a partially neutralized amine terminated urethane oligomer dispersion and a dispersion of polyepoxides would be reduced, when compared to a similar system utilizing complete neutralization of the amine functionality of the dispersed oligomer. The typical primary amine:1,2-oxirane interactions are inhibited and do not occur between a primary amine salt and the polyepoxide. It has been found, additionally, that the ultimate ambient-cure properties (e.g. 2 weeks cure time at 75° F., 50% relative humidity) of systems utilizing completely neutralized amine functional urethane oligomers, and even systems with 50% neutralization, have important performance property deficiencies, when compared to similar systems employing oligomers with somewhat less than about 50% of the amine function neutralized.

It might also be expected, however, that amine functional urethane oligomer dispersions with somewhat less than complete neutralization of amine functionality, and especially with somewhat less than 50% neutralization would exhibit reduced shelf stability. Indeed, it has been found that when neutralization is reduced to less than about 20%, the resulting dispersion has a relatively high viscosity, is often lumpy, and irreversible coagulation of oligomers neutralized from about 25% of stoichiometry to complete neutralization, however, exhibit essentially identical dispersed state characteristics of viscosity, translucency, and shelf life.

A variety of neutralizing and dispersing techniques can be employed to disperse the oligomer;

Concentrated acetic acid may be added directly to the oligomer solution (resulting in a significant resin viscosity increase). The viscous resin can then be slowly added to water, with vigorous agitation, or water may be slowly added to the resin, with vigorous agitation.

The oligomer solution may be neutralized with dilute acetic acid (e.g. 10%–50% acid by weight). The viscosity of the solution increases, but not as severely as when concentrated acid is used. The acidified resin can then be added to water or water can be added to the resin.

The calculated weight of acid can be added to the water of dispersion and the unneutralized resin can be added to acidified water, or the acidified water can be slowly added into the unneutralized resin.

Vigorous agitation is essential for each of the dispersion options, although somewhat less than high-shear agitation is needed. A somewhat viscous colloidal dispersion of solvent swollen resin particles in water results. The acid neutralized oligomer spontaneously disperses without the aid of a surfactant or emulsifying agent.

The dispersion at this point normally contains the organic solvents used to prepare the isocyanate functional prepolymer, plus a quantity of regenerated ketone from the hydrolysis of imine that occurs spontaneously when the ketimine terminated oligomer is dispersed in water. This dispersion can be used as is (as Component B), and be blended with an aqueous dispersion of polyepoxides (Component A) to provide a urethane-epoxy copolymer protective coating system with excellent ambient-cure properties. It can readily be appreciated, however, that the above amine terminated oligomeric dispersion contains undesired high levels of volatile organic solvent, and therefore, the above described coating system could pose serious toxicity and/or flammability concerns during application. In the interest of providing a coating system that minimizes these concerns, and one that meets current E.P.A. requirements for V.O.C., it is preferred that the volatile materials in Component B are removed. The choice of solvents used for prepolymer processing, and the choice of the ketone for the synthesis of the ketimine have a major impact on the success of the solvent stripping operation. Organic solvents, including the ketones, with boiling ranges considerably higher than that of water may be difficult to strip. Another benefit from the removal of the organic processing solvents and the regenerated ketones is that the viscosity of the dispersion reduces as solvents are removed, apparently from a reduction in resin particle size as solvent is extracted.

It is well known to those skilled in the art that glycol ethers or blends or glycol ethers and other organic solvents in waterborne coating systems can provide a number of useful functions in addition to functioning as a coalescing aid. They can improve the flow properties of the coating, can help control sagging and running, and can influence the evaporation of the water/solvent/volatile solubilizing acid system. A variety of ethers of ethylene, diethylene, and propylene glycols are utilized commercially in waterborne coating systems; the butyl ether of ethylene glycol (e.g. Butyl Cellosolve, Union Carbide; Ektasolve EE, Eastman Chemical Products, Inc.), is a widely used example of this type solvent, often called a cosolvent.

Cosolvent addition can be made to either component of the coating system, or to both components. The quantity of cosolvent addition may range from 0 to about 20% by weight of the total applied coating, with a range of less than 1–5% preferred. In these quantities atmospheric vapor concentration levels of these low volatility type solvents during application in ambient conditions should not constitute an appreciable safety and/or health hazard.

To those versed in the technology of two part solution epoxy ambient cure coating systems using multifunctional primary amines, amido-amines, amine adducts or polyamides as curing agents, it is well established that stoichiometric blends of epoxy resins and active hydrogen atom bearing curing agents do not necessarily provide optimum coatings properties. The ratio of 1,2-oxirane equivalency to active hydrogen equivalency can be varied widely (i.e. from 1:0.5 to 1:2 or higher) and the resultant coatings will exhibit a wide range of physical property differences. Infrared analysis has shown that a slight excess of active hydrogen equivalency (e.g. $\simeq 1.1$ equivalents active hydrogen atoms per epoxide) is required to obtain complete disappearance of absorbance due to the 1,2-oxirane group. Increasing the excess of amine active hydrogens above this "optimum" level provides increased flexibility and decreased hardness and brittleness to cured films, but nearly all other properties deteriorate; tensile strength drops rapidly, chemical resistance and abrasion resistance are reduced.

It has been postulated that these property differences occur because molecular configurations in the cured polymer vary according to the amount of curing agent excess. At "optimum" blending ratios the polymer is nearly completely cross-linked, as each primary amine functional group is difunctional, capable of interacting with two epoxide groups. As the ratio of active hydrogen atoms is increased above optimum, however, in some cases only one of the two active hydrogen atoms will interact, so there will be a degree of linearity as well as a reduction in the cross-linking density in the cured polymer. At a blending ratio of 1:2 (epoxide:active hydrogen atoms), it has been postulated that the cure is more linear than cross-linking in nature.

In the present invention it has been found that the above differences in polymer configurations can be incorporated with advantage. It has been pointed out previously that urethane-type properties of this copolymer system are built into the original urethane prepolymer, and that larger prepolymer molecules with slight to moderate branching of essentially linear configurations are recommended.

Beyond this, however, it has been found that the urethane-like character of the cured copolymer can be enhanced by restricting the amount of polyepoxide "curing agent" somewhat, thereby promoting chain-extending reactions or linearity in the composite cured polymer. It has been found that the physical properties of the copolymer do not degrade as the active hydrogen atom ratio exceeds stoichiometric or optimum, and the urethane-like properties of high abrasion resistance and gloss retention are generally improved at blending ratios of 1.25–1.75 active hydrogen equivalents per epoxide. In most cases this improvement continued on as the active hydrogen excess reached 2:1.

It was also found, however, that the water resistance of the cured copolymer systems starts to decline as the active hydrogen atom excess approaches 2:1. The water resistance of essentially linear urethane polymers with slight to moderate chain branching is normally very good, so in this sense, the result was not predicted. In two part epoxy solution coatings technology, water resistance properties drop considerably as excess active hydrogen blending ratios are used, and it has been postulated that this is due to the substantial presence of partially reacted amine groups that render the film susceptible to water. If this postulation is valid, the same effect could be expected in this urethane-epoxy copolymer system, as well. When blending ratios are within the range of 1.25–1.75 active hydrogen atoms per epoxide, however, water resistance properties typically are equal to those obtained on films where the blending ratio is essentially stoichiometric.

A unique feature of the invention is the extended pot life of the product after the two components are mixed at the application site. Typically, epoxy-amine coating systems exhibit limited pot life after combining the components. Generally pot life has been associated with an increase in viscosity and has ranged from only a few minutes to several hours. When the viscosity has increased to the point where application becomes difficult, or adverse film appearance characteristics cannot be avoided, the pot life of the blend is considered to have been reached. Occasionally, when the rate of viscosity increase is slow, the pot life is determined by measuring physical properties of the cured coating applied at various intervals as pot age increases. A significant drop in physical properties indicates that pot life has been exceeded. Generally, systems of the latter type have pot lives of only a few hours; we are not aware of any such system that has a pot life that exceeds 24 hours. The rate of viscosity increase of the urethane-epoxy system of the present invention is extremely slow. The product typically exhibits good application characteristics as long as 3-4 days after blending the components. No difference in the physical properties has been detected between coatings applied ninety six hours after blending to those applied initially. After blending, the properties noticeably dropped after 10 days.

An evaluation of experimental aqueous urethane-epoxy copolymer coatings was conducted to determine if such coatings could meet the objective of providing properties similar to those of high performance type polyurethane solution coatings. The considerations involved in test method selection, and a description of methods chosen is as follows.

Perhaps the predominant performance feature of polyurethane coatings which sets them apart is their "toughness". The Paint/Coatings Dictionary, published by the Federation of Societies for Coatings Technology, 1978, defines toughness as "that property of a material by virtue of which it can absorb work." Brittle is defined in the same volume as " . . . the opposite of tough." Possibly a measure of the resiliency of a protective coating film would be a good measure of its toughness; unfortunately, this parameter is difficult to measure in films whose thickness ranges from 5–80 microns (0.2–3.15 mils). Abrasion resistance is a commonly measured property in the protective coatings industry and is closely related to toughness, as it measures the work absorbing capacity of a coating.

A variety of abrasion resistance test techniques for protective coatings are published by ASTM. Method D-4060-81, "Abrasion Resistance of Organic Coatings by the Taber Abraser," is perhaps the most popular. Method D-658-81, "Abrasion Resistance of Organic Coatings by the Air Blast Abrasives Test", is believed by many to provide more consistent values from run to run, or season to season, and has been the method used in measuring the abrasion resistance of the coatings of this invention. Abrasion resistance values by this test are reported in terms of grams of silicon carbide grain abrasive required to remove 1 mil of coating under specified test conditions; in general, the higher the value, the greater the ability of the protective coating to resist abrasion. This definition has to be qualified, however, because formulations that are very soft and extensible, but yet resilient, provide the highest abrasion resistance values, but are often too soft to be useful as protective coatings.

Typical clear/pigmented protective coatings yield abrasion resistance values according to the air blast abrasive test as follows:

| | |
|---|---|
| Alkyds | 35–70 (g/mil) |
| Epoxy esters | 40–80 |
| 2 part solution epoxies | 55–90 |
| Oil-modified urethanes | 40–85 |
| Moisture-cure urethanes | 100–225 |
| 2 Part urethane solution | 100–225 |

Within the ranges listed above, and depending on the overall performance requirements of the coating system, the highest abrasion resistance values often do not reflect optimal performance. A commercially available aromatic moisture cure urethane coating product of excellent quality, designed for use as an industrial concrete floor coating, and used as a control in this study, needs sufficient tensile or cohesive strength to resist scratching, and needs sufficient hardness to resist dirt collection from industrial traffic. The abrasion value for this product ranges from 150–170 (g/mil). A commercial two part aliphatic urethane solution coating, also of good quality, is optimized for high chemical resistance. Therefore it is somewhat harder and less extensible than the moisture cure product; its air blast abrasion value is in the 105–120 range.

Film hardness in this study has been evaluated with 2 measuring techniques, including the well-known Sward hardness rocker, which measures the damping effect of a coating on the rocking action of a two blade rocker, previously calibrated on plate glass. Calibration results are adjusted to yield a value of 100 on plate glass so that Sward hardness of a coating can be interpreted as a percentage of the value on plate glass. Generally speaking, Sward hardness values for commercially available protective coatings, with rare exception, fall in the range of about 15 (very soft) to 70 (very hard). One drawback of the method is that surface imperfections such as dust in the film, trapped bubbles, or poor leveling tends to further dampen the rocking action, thereby yielding values somewhat less than actual.

ASTM method D-4366-84, "Hardness of Organic Coatings by Pendulum Damping Tests" describes the Konig hardness tester, the other hardness measurement used in this evaluation. This method is preferred by many over the Sward test, since coating surface imperfections have little influence on the hardness reading. Konig hardness is defined (ASTM) as "time in seconds for the swing amplitude of the Konig pendulum to decrease from 6° to 3°". This unit is also calibrated on plate glass, yielding a value of 250±10 seconds. On harder coatings the Konig value approximates 2.5 times the Sward value; on softer coatings the difference is slightly less.

The water resistance of the experimental and control coatings of this study was evaluated by depositing puddles of distilled water on the surface of coatings applied and cured on glass in standard conditions of 73° F., 50±5% relative humidity for two weeks. The effect of exposure to water was evaluated immediately after removal of the water, and again after a 1 hour recovery period. Evaluations were made after water exposures of 1 hour, 4 hours, and 24 hours duration. In all cases, evaluations included performances of control coatings, including the control moisture cure urethane mentioned above. Water resistance performance ratings of the experimental coatings were based on comparisons with the control.

The following examples set forth the sequential steps for preparing the coatings, and the results obtained from the above testing regimen.

EXAMPLE 1

Formation of the Ketimine

The condensation product obtained by reacting N-(aminoethyl)piperazine and methylethyl ketone results in release of water and formation of a ketimine. The primary amine is thus "blocked" from reacting with isocyanates. Suitable amines may be mono (primary) functional or multifunctional. Any non-cyclic ketone can be used to form the ketimine, but methylethyl ketone (MEK), and methylisobutyl ketone (MIBK) are preferred due to practical considerations.

EXAMPLE 1(a)

In a typical preparation, a gram mol of N-(aminoethyl)piperazine (AEP, 129 g), is combined with 1.1 gram mol of MEK (79.2 g) in a nitrogen blanketed reaction flask along with approximately 200 g of cyclohexane. The mixture is heated to reflux temperature (80°–85° C.) and is refluxed until the stoichiometric quantity (18 g) of water has been collected in a Dean-Stark trap. Cyclohexane and excess MEK are then removed from the ketimine in a rotary evaporator. Infrared scans of the ketimine are made to insure the development of absorption due to C=N formation (1660 cm$^{-1}$), and the disappearance of absorption due to C=O at 1710 cm$^{-1}$, and the disappearance of absorption due to NH$_2$ at around 1600 cm$^{-1}$. The amine equivalent weight of the product is determined to be 195.

Example 1(b)

A gram mol of diethylene triamine (DETA, 103 g) is combined with 2.2 mol MIBK (220 g), and approximately 300 g cyclohexane, using the procedure of Example 1(a). After removal of the stoichiometric condensed water (36 g), the reflux solvent and excess MIBK are removed. The equivalent weight of the product is determined to be 273.

EXAMPLE 2

Preparation of the Urethane Prepolymer

The base isocyanate prepolymer can be prepared from a variety of polyols and isocyanate prepolymers. The possibilities are endless and are familiar to those skilled in the art. The following is typical:

Example 2(a)

375 g of polypropylene glycol, hydroxyl number (OH#)-149.6 (1.0 equivalents of hydroxyl), 44.66 g of trimethylolpropane (TMP, 1.0 equivalents of hydroxyl), and 217.5 g of toluene diisocyanate (TDI, 2.5 equivalents of isocyanate) are combined in a two liter glass reaction flask under a nitrogen atmosphere. A reaction temperature of 65°+2° C. is maintained by incremental addition of 424.8 g of dry MEK (<0.05% water). After 8 hours the isocyanate content is 1.96% (theoretical, 1.98%). Non volatile content (N.V.) is 60.1%, Brookfield viscosity—265 centipoise. The free isocyanate (NCO) equivalent weight of the prepolymer, solids basis, is 1288, and is 2142.8, solution basis. It is listed as Prepolymer 1 in Example 2(b).

Example 2(b)

The following prepolymers were prepared by the procedure described in Example 2(a).

| Prepolymer ID | Type of Glycol | Type of Diisocyanate | NCO:OH | % NCO | equiv. wt. solids |
| --- | --- | --- | --- | --- | --- |
| 1 | PPG | TDI | 1.25 | 1.96 | 1288 |
| 2 | PPG | TDI | 1.4 | 2.27 | 931 |
| 3 | PPG | TDI | 1.68 | 4.06 | 533 |
| 4 | PPG | TDI | 2.0 | 4.98 | 411 |
| 5 | *PPG | TDI | 1.4 | 2.96 | 695 |
| 8 | PPG | TDI | 1.6 | 3.23 | 788 |
| 7 | PTMEG | TDI | 1.4 | 2.79 | 858 |
| 8 | PTMEG | TDI | 1.67 | 5.25 | 584 |
| 9 | Cap | Des W | 1.5 | 2.63 | 958 |
| 10 | PPG | MDI | 1.67 | 2.31 | 1004 |
| 11 | PTMEG | MDI | 2.0 | 2.5 | 1196 |
| 12 | PPG | IPDI | 1.5 | 2.95 | 859 |
| 13 | PE | Des W | 1.67 | 1.90 | 1121 |

PPG - Polypropylene glycol, OH# - 149.6
*PPG - Polypropylene glycol, OH# - 112.4
PTMEG - Polytetramethylene glycol, OH# - 112.1
Cap - Polycaprolactone, diol, OH# - 214
PE - Poly (Neopentyl Adipate) OH# - 111.4
Des W - Bis (4-isocyanatocyclohexyl)hexane
IPDI - Isophorone diisocyanate
TDI - Toluene diisocyanate
MDI - 4,4-methylene bis(phenyl isocyanate)

EXAMPLE 3

Formulation of the Ketimine Blocked Urethane Oligomer

This is a straight stoichiometric addition reaction. The ketimine is reacted under anhydrous conditions at the secondary amine site with a urethane prepolymer having a reactive terminal isocyanate group resulting in a urethane oligomer terminated by the ketimine. Thus the functional isocyanate group reacts with the secondary amine as it is prevented from reacting with the primary amine due to the ketimine mask.

Example 3(a)

96.6 g of Example 1(a) is combined with Example 2(a) in a 2 liter glass reaction flask under a nitrogen atmosphere with vigorous agitation at a temperature of 40° C. After 20 minutes, an infrared scan indicated a complete reaction by the disappearance of absorption due to unreacted NCO at 2250 cm$^{-1}$.

Example 3(b)

The 13 prepolymers of Example 2(b) were combined with the monoketimine of Example 1(a) or the polyketimine of Example 1(b) or were divided so portions could be combined with each, by the procedure of Example 3(a) as follows:

| Prepolymer ID | Oligomer ID | Terminal Amine Group |
|---|---|---|
| 1 | 1 (a) | AEP |
| 1 | 1 (b) | DETA |
| 2 | 2 (a) | AEP |
| 2 | 2 (b) | DETA |
| 3 | 3 (b) | DETA |
| 4 | 4 (a) | AEP |
| 5 | 5 (a) | AEP |
| 5 | 5 (b) | DETA |
| 6 | 6 (b) | DETA |
| 7 | 7 (a) | AEP |
| 7 | 7 (b) | DETA |
| 8 | 8 (b) | DETA |
| 9 | 9 (a) | AEP |
| 10 | 10 (a) | AEP |
| 11 | 11 (a) | AEP |
| 12 | 12 (a) | AEP |
| 13 | 13 (a) | AEP |

EXAMPLE 4

Neutralizing and Hydrolyzing the Blocked Oligomer to Form an Amine-Terminated Urethane-(Component B)

The ketimine terminated oligomer is neutralized with a volatile organic acid to render it water dispersible and hydrolyzable. Water is then introduced to hydrolyze the ketimine, restoring the primary amine functionality and regenerating the ketone, which is subsequently stripped, along with other processing organic solvents. The primary amine functionality may then be coupled to an epoxy resin dispersed in water, to form the coating at the site or place of use.

The following product of neutralization and hydrolysis is presented with the understanding that the ammonium acetate (cationic terminal group) is approximately 33%, the remainder being terminated by NH$_2$.

Example 4(a)

Glacial acetic acid is added to the product of Example 3a with vigorous agitation, resulting in a significant solution viscosity increase. 234 g. MEK is added to reduce viscosity and after thorough blending, the acidified product is slowly added to 1995 g. distilled water, using vigorous low shear agitation. A colloidal dispersion of the solvent-swollen resin in water results, (N.V.- 20.7%, Brookfield viscosity-165 cps). As MEK is stripped from the dispersion in a laboratory rotary evaporator, the viscosity gradually drops. When 680 g. MEK, plus approximately 5 g. water has been collected, and when the distillate appears to be composed of water entirely, the stripping is discontinued. The final product characteristics are:

| | |
|---|---|
| N.V. % | 25.8 |
| Viscosity | 8 cps (Brookfield) |
| pH | 7.05 |
| Appearance | Slightly amber translucent |
| Organic solvent content | 0.85% MEK via gas chromatographic (G.C.) analysis |

Example 4(b)

The 17 oligomers of Example 3(b) were dispersed in water following the procedure of Example 4(a), as follows:

| Oligomer ID | % Neutralization | % N. V. Solids | Viscosity cps | Active Hydrogen Equivalent wt./solution |
|---|---|---|---|---|
| 1 (a) | 33 | 25.8 | 8 | 2517 |
| 1 (b) | 33 | 25.8 | 10 | 1231 |
| 2 (a) | 33 | 30.2 | 240 | 1755 |
| 2 (b) | 33 | 33.2 | 500 | 780 |
| 3 (b) | 25 | 31.4 | 100 | 560 |
| 4 (a) | 33 | 38.2 | 87 | 780 |
| 5 (a) | 33 | 31.3 | 200 | 1319 |
| 5 (b) | 33 | 34.1 | 420 | 571 |
| 6 (b) | 33 | 27.3 | 21 | 816 |
| 7 (a) | 33 | 29.5 | 40 | 1674 |
| 7 (b) | 33 | 28.0 | 55 | 924 |
| 8 (b) | 33 | 35.1 | 65 | 482 |
| 9 (a) | 33 | 32.5 | 32 | 1673 |
| 10 (a) | 33 | 34.0 | 66 | 1667 |
| 11 (a) | 33 | 31.8 | 101 | 2084 |
| 12 (a) | 33 | 30.3 | 380 | 1630 |
| 13 (a) | 33 | 34.0 | 88 | 1839 |

EXAMPLE 5

The Epoxy Dispersion (component A)

Example 5(a)

CMD WD 55-3520 epoxy resin is a 55% solids emulsion of a low-melting solid epoxy resin in water and 2-propoxyethanol (available from Interez, Inc., Louisville, KY.) The epoxide equivalent weight is 525 (on solids). The 12,000 cps emulsion is diluted for use as follows;

| Component | Parts by wt. | Properties of Resulting Product |
|---|---|---|
| CMD WD 55-3520 | 640.0 | Viscosity 1260 cps |
| Distilled water | 130.7 | Wt/epoxide (sol.) 1175 |
| 2-butoxyethanol | 12.8 | Nonvolatiles (%) 44.66 |
| 1% FC 129* | 4.8 | V.O.C. (g/liter) 84.2 |
| Total | 788.3 | |

*FC 129 is a flow-control additive - 3M Co., St. Paul, MN

The above can be used as is as component A, or it can be modified by the addition of various liquid epoxy resins directly into the emulsion.

Example 5(b)

| Component | Parts by wt. | Properties of Resulting Prod. |
|---|---|---|
| 1 equiv. Example 5 (a) | 1175 | Viscosity 1420 cps |

| Component | Parts by wt. | Properties of Resulting Prod. |
|---|---|---|
| 1 equiv. Epon 828* | 188 | Wt./epoxide (sol.) 681.5 |
| | | Nonvolatiles (%) 52.3 |
| Total | 1363 | V.O.C. (g/liter) 67 |

*Epon 828 (Shell Chemical Co., Houston, Texas) - epoxide equivalent weight, 185-192

Procedure: Example 5(a) is charged into a Cowles Dissolver; Epon 828 is added slowly with moderate, low shear agitation. Continue agitation for 10 minutes after all the liquid resin has been added.

Example 5(c)

| Component | Parts by wt. | Properties of Resulting Prod. |
|---|---|---|
| Epon 830* 1 equiv. | 194.00 | Viscosity 60 cps. |
| Triton X-405 (70%)** | 9.69 | Wt./epoxide (sol.) 370 |
| Water | 166.66 | Nonvolatiles, % 55.0 |
| | | V.O.C. 0 |
| Total | 370.35 | |

*Epon 830 (Shell Chemical Co.), Epoxide equiv. wt. 190-198, Viscosity, 17,000-22,500 cps.
**Triton X-405 (Rohm and Haas Co., Philadelphia, PA) a nonionic surfactant.

The epoxy resin and surfactant are charged into a Cowles Dissolver. Water is added in increments of 10% of total water, with good mixing between additions. After about 60% of the total water is added the viscosity starts to decrease and the speed of the Cowles Dissolver can be reduced while adding the balance of water.

EXAMPLE 6

The Two Component Coating Test Program

Each of the oligomer dispersions of Example 4(b) were mixed with one or more of the polyepoxides of Example 5(5a, 5b, 5c). A 3 mil (wet) film was drawn down on glass for evaluation of dry film properties. Film hardness was measured by Sward rocker and Konig pendulum methods at intervals of 24 hours, 72 hours, 1 week and 2 weeks while curing at standard conditions of 73°±2° F., 50±5% relative humidity. Air blast abrasion tests and water resistance tests were initiated upon completion of the 2 week cure period. A commercial moisture cure urethane coating product (Tennant #420 Urethane Finish) and a commercial aqueous two part epoxy floor sealer (Tennant #405 Water Epoxy) were included as controls in each test run. Results of these tests are tabulated below.

Example 6(a)

These data are presented to illustrate the influence on the physical and performance properties of the final coating resulting from prepolymer variations in molecular size (equivalent weight per unreacted isocyanate function). Example 5(a) polyepoxide was used as component A in the examples below:

| Oligomer ID | Prepolymer Equiv. Wt. (solids) | Components A:B Ratio (by equiv.) | 2 week film hardness Sward % | 2 week film hardness Konig sec. | Air Blast Abrasion Value |
|---|---|---|---|---|---|
| 1 a | 1170 | 1:1 | 19 | 72 | 113 |
| " | " | 1:2 | 22 | 90 | 109 |
| 1 b | " | 1:1 | 37 | 89 | 101 |
| " | " | 1:2 | 39 | 110 | 118 |
| 2 a | 931 | 1:1 | 41 | 146 | 94 |
| " | " | 1:2 | 43 | 156 | 98 |
| 2 b | " | 1:1 | 45 | 152 | 71 |
| " | " | 1:2 | 44 | 156 | 131 |
| 3 b | 533 | 1:1 | 24 | 92 | 77 |
| " | " | 1:2 | 24 | 82 | 87 |
| 4 a | 411 | 1:1 | 26 | 83 | 37 |
| " | " | 1:2 | 28 | 103 | 48 |
| Control 1 1 part aqueous epoxy | — | — | 33 | 97 | 73 |
| Control 2 moisture cure urethane | — | — | 34 | 104 | 157 |

Prepolymers 1, 2, 3 and 4 are identical except for the quantity of diisocyanate; they contain 2.5, 2.8, 3.36 and 4 equivalents of isocyanate, respectively.

Each oligomer dispersion was neutralized at 33% of stoichiometric.

Example 6 (b)

The blending ratios of Components A and B were varied to determine the effect of deviating from the stoichiometric 1:1 epoxide:amine active hydrogen ratio.

The polyepoxide used as Component A was Example 5 (a).

| Oligomer ID | Epoxide:H+ Ratio | 2 week hardness Sward % | 2 week hardness Konig sec. | Air Blast Abrasion Value |
|---|---|---|---|---|
| 5 a | 1:0.75 | 27 | 99 | 72 |
| | 1:1 | 28 | 114 | 86 |
| | 1:1.5 | 29 | 112 | 91 |
| | 1:2 | 30 | 109 | 74 |
| 5 b | 1:0.5 | 19 | 87 | 54 |
| | 1:0.75 | 22 | 106 | 56 |
| | 1:1 | 28 | 101 | 77 |
| | 1:1.5 | 20 | 95 | 78 |
| | 1:2 | 28 | 112 | 101 |
| 6 b | 1:0.5 | 10 | 66 | 63 |
| | 1:0.75 | 12 | 83 | 89 |
| | 1:1 | 13 | 85 | 90 |
| | 1:1.5 | 11 | 74 | 122 |
| | 1:2 | 10 | 53 | 125 |
| 7 a | 1:1 | 28 | 127 | 131 |
| | 1:1.25 | 28 | 127 | 131 |
| | 1:1.5 | 26 | 122 | 150 |
| | 1:1.75 | 30 | 121 | 165 |
| 7 b | 1:1 | 24 | 120 | 105 |
| | 1:1.3 | 26 | 150 | 134 |
| | 1:2 | 15 | 133 | 127 |
| 8 b | 1:1 | 48 | 127 | 82 |
| | 1:2 | 47 | 148 | 113 |

Example 6 (c)

The following illustrates the effect of varying the degree of neutralization of the oligomer terminal amines. Example 3 b and 5 b illustrate the effect of exceeding the 25-40% neutralization range; Example 7 a illustrates the apparent negligible effect of variations within this range. The polyepoxide of Example 5 (a) was used in these examples.

| Oligomer ID | % Neutrali- zation | Epoxide:H+ Ratio | 2 week hardness | | Air Blast Abrasion Value |
|---|---|---|---|---|---|
| | | | Sward % | Konig sec. | |
| 3 b | 33 | 2:1 | 24 | 81 | 87 |
| | 46 | 2:1 | 19 | 53 | 44 |
| 5 b | 33 | 2:1 | 24 | 99 | 76 |
| | 66 | 2:1 | 24 | 67 | 34 |
| | 100 | 2:1 | 18 | 54 | 29 |
| 7 a | 27 | 1:1.3 | 25 | 130 | 155 |
| | 30 | 1:1.3 | 23 | 132 | 140 |
| | 33 | 1:1.3 | 28 | 134 | 151 |
| | 37 | 1:1.3 | 26 | 133 | 151 |

Example 6 (d)

These data illustrate the effect of varying polyepoxides. The polyepoxide of Example 5 (a) is identified below as Polyepoxide A, Example 5 (b) is Polyepoxide B, and Example 5 (c) is Polyepoxide C. The versatility of the invention is also demonstrated in this example. Prepolymer ingredients (polyol and isocyanate types) and polyepoxides can be varied widely, promising systems that can be tailor-made to meet a wide variety of performance requirements.

| Oligomer ID | Poly- epoxide ID | Epoxide:H+ Ratio | 2 week Hardness | | Air Blast Abrasion Value | Water. Resis. Rating |
|---|---|---|---|---|---|---|
| | | | Sward % | Konig sec. | | |
| 7 a | A | 1:1.3 | 36 | 122 | 168 | 1 |
| | B | 1:1.3 | 28 | 122 | 161 | 2 |
| | C | 1:1 | 31 | 116 | 176 | 2 |
| | | 1:1.3 | 29 | 118 | 190 | 2 |
| 9 a | A | 1:1.3 | 30 | 83 | 191 | 2 |
| | B | 1:1.3 | 33 | 78 | 143 | 2 |
| 10 a | A | 1:1.3 | 27 | 79 | 148 | 1 |
| | B | 1:1.3 | 21 | 68 | 147 | 1 |
| 11 a | A | 1:1.3 | 28 | 70 | 195 | 1 |
| | B | 1:1.3 | 26 | 49 | 232 | 3 |
| 12 a | A | 1:1.3 | 33 | 124 | 85 | 1 |
| | B | 1:1.3 | 20 | 88 | 71 | 1 |
| 13 a | A | 1:1.3 | 27 | 71 | 217 | 1 |
| | B | 1:1.3 | 21 | 51 | 208 | 1 |
| Control 1 2 part aqueous epoxy | — | — | 33 | 97 | 73 | 1 |
| Control 2 moisture cure urethane | — | — | 34 | 104 | 157 | 1 |

Water resistance rating-based on 24 hour water exposure and a comparison with the resistance of control 2 (moisture cure urethane). Rating of 1 indicates no detectible effect on film one hour after removal of water, 2 indicates complete recovery but slight loss of bond from glass substrate, 3 indicates complete recovery but a ring remains visible (impressed by the edge of the cover glass) 4 indicates complete recovery of film hardness but bubbles remain under the film. 5 indicates film did not recover original hardness.

In summary, the following statements are appropriate to the entire disclosure. Monosecondary (NH) mono or difunctional primary ($NH_2$) amines are preferred and specified herein. However, an amine may be used in which the monosecondary amine function is replaced by another functional group presenting a single active hydrogen. A ketimine with hydroxyl functionality is possible, for example.

The ratio of amine active hydrogens to epoxides can be varied widely for our coating purposes, from slightly less than 1:1 (substantially stoichiometric) to 2:1 (substantially in excess of the stoichiometric ratio). A ratio of 1.3:1 is deemed optimum. However, since the inclusion of epoxy to effect cross-linking and ultimate cure provides water resistance, hardness and adhesiveness, the ratio can vary widely depending upon the extent to which these properties are to be emphasized. Taking this into account the ratio conceivably could be as low as 0.5:1 or as high as 4:1.

We have referred to the limited range of neutralization as about 27%-37%. This is preferred as the safe range but it may be mentioned that no substantial drop-off in properties is observed until neutralization is in the range of 40-43%; likewise, the lower limit is not well defined and may reach to 20% or even less in some instances.

Hence, while we have illustrated and described the preferred limits and preferred embodiments it is to be understood these are capable of variation and modification for actual practice within the purview of the appended claims.

We claim:

1. A method of preparing a primary amine terminated urethane oligomer in aqueous dispersion form and combining it with an aqueous dispersion of polyepoxides to result in an ambient curing (room temperature curing, e.g. 70° F.) urethane-epoxy copolymer coating system comprising the steps of:
   A. producing a mono or polyketimine by reacting a monoketone and the primary amine functionality of a mono or polyfunctional primary amine compound that contains one other functional group bearing one active hydrogen atom that is reactive with isocyanate functionality, and;
   B. producing an isocyanate terminated prepolymer of an equivalent weight per unreacted isocyanate group ranging from about 250 to about 5000, and preferably from about 750 to about 4000 by combining suitable polyfunctional hydroxyl bearing monomers and/or polymers with an excess of suitable aromatic and/or aliphatic polyfunctional isocyanate monomers, preferably difunctional isocyanate monomers, and subsequently terminating the prepolymer reactive isocyanate functionality by an essentially stoichiometric addition of the mono or polyketimine of A, based on the free hydrogen atom equivalency of the mono or polyketimine compound, whereby the addition reaction yields a mono or polyketimine terminated urethane oligomer substantially free of residual isocyanate functionality, and;

C. neutralizing to salt form part of the amine nitrogens of the oligomer with a volatile acid and dispersing in water both the neutralized and unneutralized oligomer, thereby hydrolyzing the ketimine to restore the primary amine functionality and to regenerate the ketone which is subsequently stripped, yielding an aqueous oligomer dispersion with only residual volatile organic content;

D. mixing the aqueous oligomer dispersion with an aqueous dispersion of polyepoxides, a substantial portion thereof being composed of dispersed difunctional glycidal ethers of bisphenol A, of equivalent weights per epoxide ranging from 180–525, and which may or may not include other modifying aliphatic di or trifunctional polyepoxides of equivalent weights ranging from 120 to 680 and applying the mixture as a thin film at ambient conditions to a supporting surface to produce thereon a urethane-epoxy copolymer through chain extending and cross-linking primary amine-1,2-oxirane interactions upon evaporation of water and volatile acid from the applied film.

2. A method according to claim 1 in which the ketone of step A is methylethyl ketone or methylisobutyl ketone in which the amine is N-(aminoethyl)piperazine or diethylene triamine and in which the range of neutralization in step C is between 27–37 percent.

3. A method according to claim 1 in which steps A and B are stoichiometric, in which the amount of neutralization according to step C is in the range of 27–37 percent and in which the extent of chain extension and cross-linking of step D lies between the stoichiometric basis, in which each hydrogen of the primary amine function couples to an epoxide, to a substantial excess.

4. An aqueous system to be mixed, stirred and spread on a substrate as a coating, substantially devoid of volatile hazardous organic solvents comprising the following components:
A. an aqueous dispersion of polyepoxides; and
B. an aqueous dispersion of a urethane oligomer terminated by a primary amine group reactive with the epoxy groups and in which a portion of the amine groups are transformed to a salt by neutralization with an acid in the dispersion, so that upon mixing and spreading the components the primary amine function is activated for epoxide cross-linking as the acid evaporates.

5. A system according to claim 4 in which the amine salt equivalent is in the range of 27–37 percent of the amine function present.

6. A system according to claim 5 in which the amine active hydrogen functionality is at least equivalent to the epoxide function on a stoichiometric basis so that the coating has predominant urethane character.

7. A system according to claim 6 in which the urethane oligomer is one in which N-(aminoethyl)piperazine is coupled at its secondary amine site to the isocyanate functional group of a urethane prepolymer prepared by reacting a polyglycol with excess organic diisocyanate.

8. A system according to claim 7 in which the ratio of amine active hydrogens to epoxides is about 1.3:1.

9. A system according to claim 4 in which the urethane oligomer is one in which N-(aminoethyl)piperazine is coupled at its secondary amine site to the isocyanate functional group of a urethane prepolymer prepared by reacting a polyglycol with excess organic diisocyanate, and in which the ratio of amine active hydrogens to epoxides is about 1.3:1.

10. An aqueous system to be mixed, stirred and spread on a substrate as a coating, substantially devoid of volatile hazardous organic solvents comprising the following components:
A. an aqueous dispersion of polyepoxides, a substantial portion thereof being composed of dispersed difunctional glycidal ethers of bisphenol A of equivalent weights per epoxide ranging from 180–525, and which may or may not include other modifying aliphatic di or trifunctional polyepoxides of equivalent weights ranging from 120 to 680, and;
B. an aqueous dispersion of a urethane oligomer terminated with primary amine functional groups which are reactive with epoxides, such oligomer being the reaction product of an isocyanate terminated prepolymer and a mono or polyketime compound containing one other functional group bearing a single active hydrogen atom, the site of the terminating addition, such isocyanate terminated prepolymer resulting from combining suitable polyfunctional hydroxyl bearing monomers and/or polymers with an excess of suitable aromatic and/or aliphatic polyfunctional isocyanate monomers, preferably difunctional isocyanate monomers, such reactants being selected and combined in such proportions to yield essentially linear or moderately branched chain prepolymer molecules of an average equivalent weight per unreacted isocyanate function ranging from about 250 to about 5000, and preferably from about 750 to about 4000, such ketimine terminated oligomer being dispersed into water aided by neutralization of 25–40% of the amine function by a volatile organic acid, such dispersion subsequently being stripped of volatile processing solvents as well as the regenerated ketone formed by hydrolysis of the ketimine or polyketimine during dispersion.

11. A system according to claim 10 whereby the two components (A) and (B) may be combined at the site of application by simple mixing and stirring in epoxide:amine active hydrogen equivalency ratios ranging from 1:0.5 to 1:2 or higher, depending on the coating performance requirements of the user, and preferably combined in ratios from 1:1.25–1.75 when coating performance similar to the performance of high performance moisture cure urethanes and/or two part urethane solution coatings is desired.

12. A system according to claim 10 whereby the oligomer of component B is terminated by either N-(aminoethyl)piperazine or diethylene triamine, wherein the ketimine/polyketimine block is formed by reaction of the primary amine active hydrogen atoms and the carbonyl of methylethyl ketone or methyl isobutyl ketone.

13. A system according to claim 12 in which the amine salt equivalent is in the range of 27-37 percent of the amine function present.

14. A system according to claim 11 in which the ratio of amine active hydrogens to epoxides is about 1.3:1.

15. A system according to claim 10 in which the urethane oligomer is one in which N-(aminoethyl)piperazine or diethylene triamine is coupled at its secondary amine site to the isocyanate functional group of a urethane prepolymer prepared by reacting a polyglycol with excess organic diisocyanate, and in which the ratio of amine active hydrogens to epoxides is about 1.3:1.

16. A method of preparing a primary amine terminated urethane in aqueous dispersion form and combining it with an aqueous dispersion of polyepoxides to result in an ambient air temperature curing urethane-epoxy coating comprising the steps of:

A. producing a ketimine by reacting a ketone and an amine having both primary amine functionality and one other functional group containing a single active hydrogen;

B. reacting the ketimine with a urethane prepolymer terminated with a reactive isocyanate group, resulting in a ketimine terminated urethane oligomer whereby the addition reaction renders the oligomer substantially free of any residual isocyanate functionality;

C. neutralizing to salt form part of the amine nitrogens of the oligomer with a volatile acid and dispersing in water both the neutralized and unneutralized oligomer, thereby hydrolyzing the ketimine to restore the primary amine functionality and to regenerate the ketone which is subsequently stripped, yielding an aqueous oligomer dispersion with only residual volatile organic content;

D. mixing the aqueous oligomer dispersion with an aqueous dispersion of polyepoxides, and applying the mixture as a thin film at ambient conditions to a supporting surface to produce thereon a urethane-epoxy copolymer film through chain extending and cross-linking primary amine-1,2 oxirane interreactions upon evaporation of water and volatile acid from the applied film to produce a urethane-epoxy copolymer which becomes both chain extended and cross-linked as the water and acid evaporate.

17. A method according to claim 16 in which the ketone of step A is a methylethyl ketone, in which the amine is N-(aminoethyl)piperazine and in which the range of neutralization in step C is between 27-37 percent.

18. A method according to claim 16 in which steps A and B are stoichiometric, in which the amount of neutralization according the step C is in the range of 27-37 percent and in which the extent of chain extension and cross-linking of step C lies between the stoichiometric basis, in which each hydrogen of the primary amine function couples to an epoxide, to a substantial excess.

* * * * *

UNITED STATES PATENT AND TRADEMARK OFFICE
CERTIFICATE OF CORRECTION

PATENT NO. : 4,772,643
DATED : Sept. 20, 1988
INVENTOR(S) : G. Dale Ernst and Alan R. Schuweiler It is certified that error appears in the above—identified patent and that said Letters Patent is hereby corrected as shown below:

Col. 2, line 40, cancel "undesireable" and insert --undesirable--.
      line 67, cancel "the" first occurrence and insert --that--.
Col. 6, line 64, cancel "perferred" and insert --Preferred--.
Col. 9, line 18, after "of" first occurrence, insert --the dispersion occurs within only a few days. Dispersions of--.
Col. 18, line 18, cancel "1 part" and insert --2-part--.

Signed and Sealed this

Seventeenth Day of August, 1993

Attest:

BRUCE LEHMAN

Attesting Officer     Commissioner of Patents and Trademarks